US011100751B2

(12) United States Patent
Oyama et al.

(10) Patent No.: US 11,100,751 B2
(45) Date of Patent: Aug. 24, 2021

(54) INFORMATION PROCESSOR, NON-TRANSITORY COMPUTER-READABLE RECORDING MEDIUM, AND GAME CONTROL METHOD

(71) Applicant: Universal Entertainment Corporation, Tokyo (JP)

(72) Inventors: Masaki Oyama, Tokyo (JP); Toshikazu Jinnouchi, Tokyo (JP)

(73) Assignee: Universal Entertainment Corporation, Tokyo (JP)

(*) Notice: Subject to any disclaimer, the term of this patent is extended or adjusted under 35 U.S.C. 154(b) by 72 days.

(21) Appl. No.: 16/534,092

(22) Filed: Aug. 7, 2019

(65) Prior Publication Data

US 2020/0074790 A1 Mar. 5, 2020

(30) Foreign Application Priority Data

Aug. 29, 2018 (JP) ............................ JP2018-160190

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G07F 17/34*** | (2006.01) |

(52) U.S. Cl.

CPC ...... *G07F 17/3213* (2013.01); *G07F 17/3267* (2013.01); *G07F 17/34* (2013.01)

(58) Field of Classification Search

USPC .............................. 463/1, 20, 22, 25, 30, 39

See application file for complete search history.

(56) References Cited

U.S. PATENT DOCUMENTS

| | | | | |
|---|---|---|---|---|
| 2010/0048281 A1* | 2/2010 | Kearns | G07F 17/3211 | 463/20 |
| 2013/0196737 A1* | 8/2013 | Kitamura | G07F 17/34 | 463/20 |
| 2013/0260862 A1* | 10/2013 | Lee | G07F 17/34 | 463/20 |

FOREIGN PATENT DOCUMENTS

JP 2013153870 A 8/2013

* cited by examiner

*Primary Examiner* — Adetokunbo O Torimiro

(74) *Attorney, Agent, or Firm* — Potomac Law Group, PLLC; Kenneth Fagin

(57) ABSTRACT

When a symbol displayed in a scroll area of a reel which stops first satisfies a predetermined condition, an information processor 1 executes a process of: setting the scroll area of the reel which is rotating and stops last as an effect display frame, hiding the rotating reel behind the effect display frame, and displaying, in the effect display frame 22, an indication effect corresponding to a predetermined game result; and after the execution of the indication effect, displaying the reel at the effect display frame again so as to display the arrangement of at least one symbol on that reel.

5 Claims, 13 Drawing Sheets

FIG.7

LOW-PROBABILITY INDICATION EFFECT TABLE

| GAME RESULT | INDICATION EFFECT | ADVANCED INDICATION EFFECT | PROBABILITY |
|---|---|---|---|
| NO PAYOUT | GOLD NUGGET | CAR | 2% |
| NO PAYOUT | CLOCK (SHORT) | — | 4% |
| NO PAYOUT | GOLD NUGGET (SHORT) | — | 4% |
| PAYOUT RATE IS 5 OR LOWER | GOLD NUGGET (SHORT) | — | 5% |
| PAYOUT RATE IS 5 OR LOWER | CLOCK (SHORT) | — | 5% |
| BONUS WON | ALL TOGETHER | — | 20% |
| BONUS WON | GOLD NUGGET | CAR | 25% |
| BONUS WON | GOLD NUGGET | SHIP | 55% |
| NO BONUS WON | GOLD NUGGET | CAR | 70% |
| NO BONUS WON | GOLD NUGGET | SHIP | 30% |

FIG.8

HIGH-PROBABILITY INDICATION EFFECT TABLE

| GAME RESULT | INDICATION EFFECT | ADVANCED INDICATION EFFECT | PROBABILITY | GAME MODE |
|---|---|---|---|---|
| NO PAYOUT | WAD OF BILLS | CAR | 5% | NORMAL GAME |
| NO PAYOUT | GOLD NUGGET | CAR | 5% | NORMAL GAME |
| NO PAYOUT | WAD OF BILLS (SHORT) | — | 1% | NORMAL GAME |
| NO PAYOUT | CLOCK (SHORT) | — | 5% | NORMAL GAME |
| NO PAYOUT | GOLD NUGGET (SHORT) | — | 4% | NORMAL GAME |
| NO PAYOUT | NO RE-TRIGGER | — | 15% | BONUS GAME |
| PAYOUT RATE IS 5 OR LOWER | WAD OF BILLS | — | 2% | NORMAL GAME |
| PAYOUT RATE IS 5 OR LOWER | GOLD NUGGET (SHORT) | — | 6% | NORMAL GAME |
| PAYOUT RATE IS 5 OR LOWER | CLOCK (SHORT) | — | 7% | NORMAL GAME |
| PAYOUT RATE IS 5 OR LOWER | — | — | 0% | BONUS GAME |
| BONUS WON | ALL TOGETHER | — | 20% | NORMAL GAME |
| BONUS WON | GOLD NUGGET | CAR | 25% | NORMAL GAME |
| BONUS WON | GOLD NUGGET | SHIP | 55% | NORMAL GAME |
| NO BONUS WON | GOLD NUGGET | CAR | 70% | NORMAL GAME |
| NO BONUS WON | GOLD NUGGET | SHIP | 30% | NORMAL GAME |

FIG.9

COMMON INDICATION EFFECT TABLE

| GAME RESULT | INDICATION EFFECT | ADVANCED INDICATION EFFECT | PROBABILITY |
|---|---|---|---|
| PAYOUT RATE IS 5 TO 20 | GOLD NUGGET | CAR | 10% |
| PAYOUT RATE IS 5 TO 20 | WAD OF BILLS | CAR | 15% |
| PAYOUT RATE IS 5 TO 20 | WAD OF BILLS | JEWEL | 10 |
| PAYOUT RATE IS 5 TO 20 | WAD OF BILLS (SHORT) | — | 5% |
| PAYOUT RATE IS 5 TO 20 | GOLD NUGGET (SHORT) | — | 5% |
| PAYOUT RATE IS 5 TO 20 | CLOCK (SHORT) | — | 5% |
| PAYOUT RATE IS 20 TO 50 | GOLD NUGGET | CAR | 20% |
| PAYOUT RATE IS 20 TO 50 | WAD OF BILLS | SHIP | 30% |
| PAYOUT RATE IS 20 TO 50 | GOLD NUGGET | SHIP | 30% |
| PAYOUT RATE IS 20 TO 50 | CAR AND JEWEL | — | 10% |
| PAYOUT RATE IS 20 TO 50 | WAD OF BILLS (SHORT) | — | 5% |
| PAYOUT RATE IS 20 TO 50 | GOLD NUGGET (SHORT) | — | 5% |
| PAYOUT RATE IS 50 TO 100 | ALL TOGETHER | — | 10% |
| PAYOUT RATE IS 50 TO 100 | GOLD NUGGET | CAR | 10% |
| PAYOUT RATE IS 50 TO 100 | WAD OF BILLS | SHIP | 30% |
| PAYOUT RATE IS 50 TO 100 | GOLD NUGGET | SHIP | 30% |
| PAYOUT RATE IS 50 TO 100 | CAR AND JEWEL | — | 20% |
| PAYOUT RATE IS 100 OR HIGHER | ALL TOGETHER | — | 25% |
| PAYOUT RATE IS 100 OR HIGHER | WAD OF BILLS | SHIP | 25% |
| PAYOUT RATE IS 100 OR HIGHER | GOLD NUGGET | SHIP | 25% |
| PAYOUT RATE IS 100 OR HIGHER | CAR AND JEWEL | — | 25% |

FIG.10

ADDITIONAL FREE GAME NUMBER RANDOM DETERMINATION TABLE

| ADDED NUMBER OF TIMES OF EXECUTION OF FREE GAME | PROBABILITY |
|---|---|
| 1 | 20% |
| 2 | 23% |
| 3 | 32% |
| 4 | 15% |
| 5 | 10% |

INFORMATION PROCESSOR, NON-TRANSITORY COMPUTER-READABLE RECORDING MEDIUM, AND GAME CONTROL METHOD

CROSS-REFERENCE TO RELATED APPLICATION

This application is entitled to the benefit of Japanese Patent Application No. 2018-160190 filed on Aug. 29, 2018.

FIELD OF THE INVENTION

The present invention relates to an information processor, a non-transitory computer-readable recording medium, and a game control method.

BACKGROUND OF THE INVENTION

Among known slot games in which reels rotate and stop in order so as to present a game result, there are slot games which have an indication effect by which a game result is indicated while the reels are still rotating and the game result has not been presented. For example, in Japanese Laid-Open Patent Publication No. 2012-015837, a game result is indicated by an indication effect of variously changing light emission of a backlight of a mechanical reel unit while reels are rotating.

BRIEF SUMMARY OF THE INVENTION

In the known slot games, however, the effect using the backlight performed during the rotation of the reels is not sufficiently conspicuous, and it is difficult for players who are not used to play games to recognize that the effect during the rotation of the reels is an indication effect indicating a game result.

In consideration of this problem, an object of the present invention is to provide an information processor, a non-transitory computer-readable recording medium, and a game control method, which are able to execute an indication effect which is easily recognizable by a player.

An information processor of the present invention includes: a display which is configured to display a play image in which reels each having a symbol array on which symbols are arranged scroll and then stop so that at least one of the symbols is rearranged on the symbol array in N display frames and a game result of a slot game is output in accordance with arrangement of the symbols in the display frames; a storage unit configured to store an indication effect corresponding to a predetermined game result; and a controller, the controller being programmed to execute the processes of: internally and randomly determine the arrangement of the symbols in the slot game; starting scroll of the reels in the respective display frames and then stopping the reels in order at different timings; when a symbol displayed in the display frame of at least one of the reels which stops first satisfies a predetermined condition, setting the display frame of the reel which is rotating and stops last as an effect display frame; hiding the rotating reel behind the effect display frame and displaying, in the effect display frame, the indication effect corresponding to the predetermined game result; and after execution of the indication effect, displaying the reel at the effect display frame again so as to display arrangement of at least one reel on that reel.

According to the arrangement above, when the reels stops in order at different timings, if the reels which stop first satisfy the predetermined condition, the display frame of the reel which stops last is set as the effect display frame, the reel is hidden behind the effect display frame, and the indication effect is executed in that area. Because the last rotating reel is temporarily hidden and the indication effect is displayed, it is suggested for the player that the displayed effect is an effect related to a game result which is determined by the last rotating reel.

The information processor of the present invention may be adapted so that, when a symbol displayed in the display frame of N−2 reel which stops first satisfies the predetermined condition, the controller sets the display frame of the reel which stops last as the effect display frame and displays the indication effect in the effect display frame.

This arrangement makes it possible to indicate that the displayed effect relates to the symbols displayed in the display frames of the reels which stop first and relates to a game result determined by the rotating reel which stops last.

The information processor of the present invention may be adapted so that, the storage unit stores plural indication effects which are different in reliability, and the controller randomly selects one of the indication effects so that a probability of achieving the predetermined game result after execution of the indication effect is high when reliability of the selected indication effect is high.

This allows the player to predict the game result during the reel rotation, and therefore improves the entertainment characteristics.

The information processor of the present invention may be adapted so that the predetermined game result is a trigger of execution of a bonus game in which the slot game is playable plural times with an advantageous condition, and when the predetermined game result is achieved in the slot game in the bonus game, the controller executes an effect of determining the number of times of execution of the slot game, which is to be added to the bonus game, in the effect display frame.

This makes it possible to improve the entertainment characteristics in the bonus game.

According to another aspect of the present invention, a non-transitory computer-readable recording medium stores a game program which causes a computer including a display and a memory to execute the processes of: displaying a play image in which reels each having a symbol array on which symbols are arranged scroll and then stop so that at least one of the symbols is rearranged on the symbol array in N display frames in the display and a game result of a slot game is output in accordance with arrangement of the symbols in the display frames; storing an indication effect corresponding to a predetermined game result in the memory; internally and randomly determining the arrangement of the symbols in the slot game; starting scroll of the reels in the respective display frames and then stopping the reels in order at different timings; when a symbol displayed in the display frame of at least one of the reels which stops first satisfies a predetermined condition, setting the display frame of the reel which is rotating and stops last as an effect display frame; hiding the rotating reel behind the effect display frame and displaying, in the effect display frame, the indication effect corresponding to the predetermined game result; and after execution of the indication effect, displaying the reel at the effect display frame again so as to display arrangement of at least one reel on that reel.

According to the arrangement above, when the reels stops in order at different timings, if the reels which stop first satisfy the predetermined condition, the display frame of the reel which stops last is set as the effect display frame, the reel is hidden behind the effect display frame, and the indication effect is executed in that area. Because the last rotating reel is temporarily hidden and the indication effect is displayed, it is suggested for the player that the displayed effect is an effect related to a game result which is determined by the last rotating reel.

A game control method of the present invention includes the steps of: displaying a play image in which reels each having a symbol array on which symbols are arranged scroll and then stop so that at least one of the symbols is rearranged on the symbol array in N display frames in a display and a game result of a slot game is output in accordance with arrangement of the symbols in the display frames; storing an indication effect corresponding to a predetermined game result in a storage unit; internally and randomly determining the arrangement of the symbols in the slot game; starting scroll of the reels in the respective display frames and then stopping the reels in order at different timings; when a symbol displayed in the display frame of at least one of the reels which stops first satisfies a predetermined condition, setting the display frame of the reel which is rotating and stops last as an effect display frame; hiding the rotating reel behind the effect display frame and displaying, in the effect display frame, the indication effect corresponding to the predetermined game result; and after execution of the indication effect, displaying the reel at the effect display frame again so as to display arrangement of at least one reel on that reel.

According to the arrangement above, when the reels stops in order at different timings, if the reels which stop first satisfy the predetermined condition, the display frame of the reel which stops last is set as the effect display frame, the reel is hidden behind the effect display frame, and the indication effect is executed in that area. Because the last rotating reel is temporarily hidden and the indication effect is displayed, it is suggested for the player that the displayed effect is an effect related to a game result which is determined by the last rotating reel.

The present invention makes it possible to execute an indication effect which is easily recognizable by a player.

BRIEF DESCRIPTION OF THE DRAWINGS

FIG. 7 illustrates a low-probability indication effect table.

FIG. 8 illustrates a high-probability indication effect table.

FIG. 9 illustrates a common indication effect table.

FIG. 10 illustrates an additional free game number random determination table.

DETAILED DESCRIPTION OF THE PREFERRED EMBODIMENT

A game system of the present invention will be described with reference to figures.

(Outline)

Figure 1:
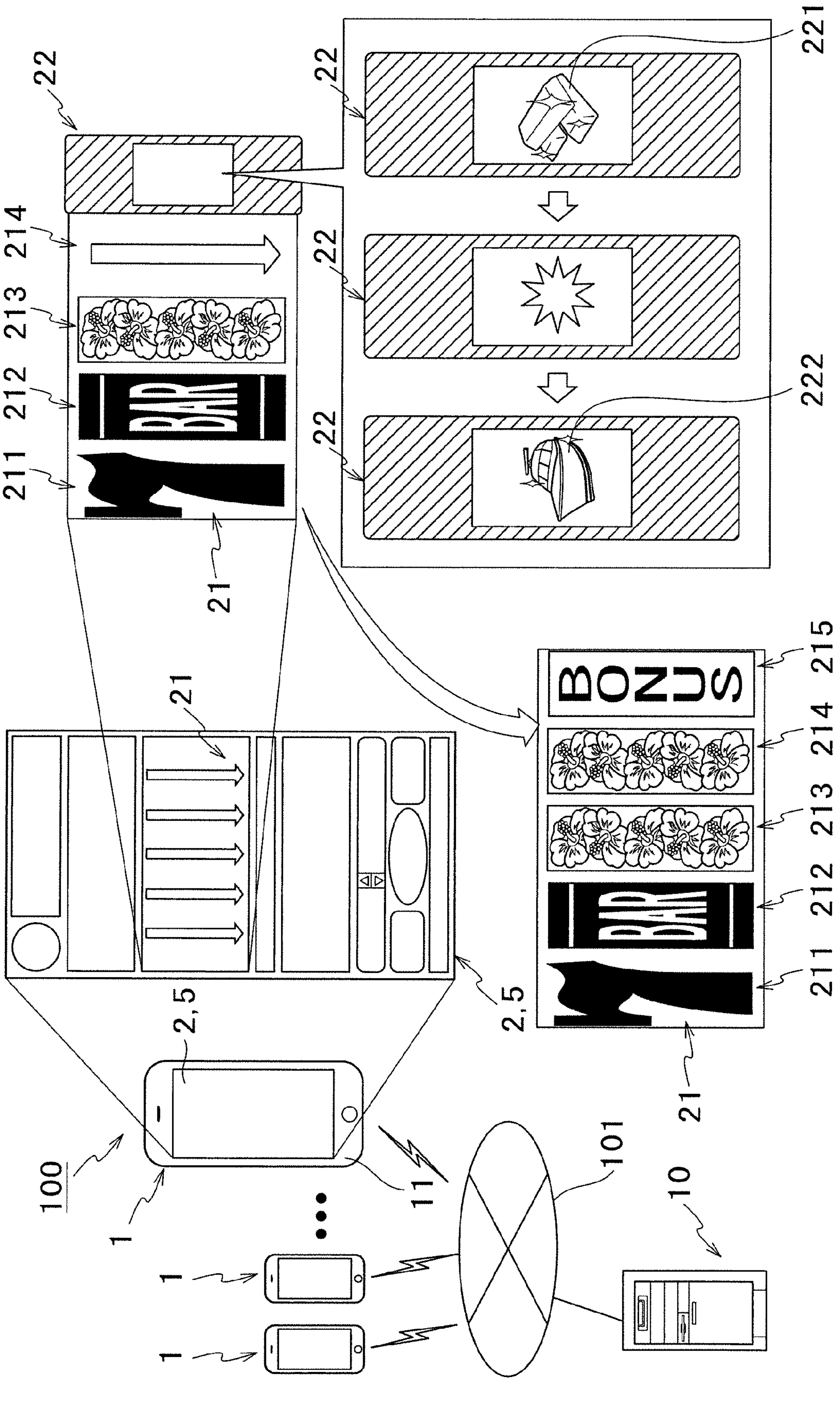
FIG. 1 illustrates the outline of an information processor.

As shown in FIG. 1, an information processor 1 is arranged so that, after a first reel to a third reel stop, an effect area is provided on a rotating fifth reel, and an effect of indicating a game result is executed in the effect area.

The information processor 1 is connected to a server 10 in a data-communicable manner via the Internet 101, thereby constituting a game system 100 including the information processor 1 and the server 10. It should be noted that the game system 100 is not limited to this, and the system may be constituted only by the information processor 1. Furthermore, the information processor 1 may indicate a game system including a terminal device such as a smartphone and a server, and functions of the information processor 1 which will be described in the present embodiment may be performed by any component of the game system.

In information processors 1, shared application software is installed from an application software server or the like corresponding to the OS (Operating System) of each information processor 1. In the present embodiment, a slot game is playable as a game element of the application software installed in the information processor 1. In other words, the user is allowed to play the slot game on this application software. The slot game may be an add-in of the application software. In other words, as an additional function of the application software, the slot game may be provided by an application software server, a server 10, etc. independently from the application software. The application software may allow the player to play plural types of slot games which are different in effects or rules. The application software may be a web browser.

As detailed later, the slot game starts on the premise of consumption of an accumulable gaming value. When a winning is achieved as a result of the slot game, a gaming value corresponding to the type of the winning and the consumed gaming value is added to the accumulated gaming value. As such, the information processor 1 executes the slot game in which the accumulable gaming value is increased or decreased in accordance with a result. The gaming value may be information (game point) which is used exclusively for starting the slot game and does not have a monetary value or may be electronic valuable information having a monetary value.

As shown in FIG. 1, the information processor 1 of the present embodiment is a so-called smartphone, and includes a display 2 provided on the front surface of a housing 11 and a touch panel 5 provided throughout the display 2. The display 2 is provided with a symbol display area 21 in which symbols are varied and stopped after the start of the game.

To be more specific, the symbol display area 21 is provided with scroll areas (scroll areas 211, 212, 213, 214, and 215) as display frames. In each of the scroll areas 211, 212, 213, 214, and 215, a video reel having a symbol array on which symbols are arranged is provided. When the slot game starts, the video reel scrolls and then stops in each of the scroll areas 211, 212, 213, 214, and 215.

Each scroll area is formed of plural cells aligned in the up-down direction. In other words, cells are provided in the symbol display area 21 to form a matrix of plural columns by plural rows. When the symbols are rearranged, a symbol is displayed in each cell. While the borders between the cells are not clearly shown in the present embodiment, frames may be displayed on the borders between the cells, for example. Four cells are provided in each scroll area. The number of cells in each scroll area is not limited to this.

As shown in FIG. 1, in each symbol array of the present embodiment, a symbol which is long and occupies four cells of one scroll area (hereinafter, a long symbol) is provided. As detailed later, a bonus game is triggered when the long symbols stop on all of the scroll areas 211, 212, 213, 214, and 215. A long symbol may always be provided to occupy all cells in the scroll area. As such, when the video reels stop, one or more symbol is rearranged in each of the scroll areas 211, 212, 213, 214, and 215.

As described above, on the display 2, a play image in which a video reel having a symbol array with symbols is scrolled and then stopped so that one or more of the symbols is rearranged is displayed in each of the five scroll areas 211, 212, 213, 214, and 215. On the display 2, furthermore, a play image in which a game result of the slot game is output in accordance with the arrangement of the symbols in the scroll areas 211, 212, 213, 214, and 215 is displayed.

In such a slot game, the information processor 1 internally and randomly determines symbols to be rearranged in the symbol display area 21, for each of the scroll areas 211, 212, 213, 214, and 215. Based on the random determination, the information processor 1 rearranges the symbols of the video reels in the scroll areas 211, 212, 213, 214, and 215.

In the scroll areas 211, 212, 213, 214, and 215, the information processor 1 starts the scroll of the video reels and then stops the video reels in order at different timings. This stop at different timings is not limited to a case where all video reels are stopped at different timings. For example, at least two video reels are stopped at different timings.

In the present embodiment, the video reel of the scroll area 215 stops last. When the symbols displayed in the scroll area with at least one video reel having already stopped satisfy a predetermined condition, the information processor 1 sets the scroll area 215 in which the video reel is rotating as an effect display frame. The predetermined condition is, for example, a condition determined by the arrangement of symbols or a condition determined by the ratio of a payout to a betted amount.

In the present embodiment, as shown in FIG. 1, when the long symbols stop in the scroll areas 211, 212, and 213 which stop first, the information processor 1 sets the effect display frame 22 on the scroll area 215. To be more specific, the information processor 1 displays the effect display frame 22 to cover the scroll area 215 so as to hide the video reel rotating in the scroll area 215 and display an indication effect 221 indicating a predetermined game result in the effect display frame 22. This indication of an game result is not limited to a case where a final game result is correctly indicated by the indication effect. In other words, the indication effect may indicate the possibility of an output of a predetermined game result. There may be plural options of indication effects for a predetermined game result, and one of the options may be randomly selected. Even if the symbols displayed in the scroll area with at least one video reel having already stopped satisfy the predetermined condition, the information processor 1 may not always set the effect display frame on the reel which stops last and execute the indication effect. For example, the information processor 1 may randomly determine whether to execute the indication effect.

When the long symbols stop in the scroll areas 211, 212, 213, and 214 which stop first, the information processor 1 displays the indication effect 221 in the effect display frame 22 and then displays an advanced indication effect 222 in the effect display frame 22. The information processor 1 then removes the effect display frame 22 and displays the video reel of the scroll area 215 again to display the symbol arrangement in the scroll area 215. To put it differently, when symbols displayed in the scroll area of N−2 reel which stop first among N scroll areas satisfy the predetermined condition, the information processor 1 sets the effect display frame on the scroll area of the reel which stops last, and displays the indication effect on that effect display frame.

As such, the information processor 1 includes the display 2 which displays a play image in which the video reel having the symbol array with the symbols scrolls and then stops so that one or more symbol is rearranged in each of the scroll areas 211, 212, 213, 214, and 215 and then a game result of the slot game is output in accordance with the arrangement of the symbols in the scroll areas 211, 212, 213, 214, and 215. The information processor 1 then internally and randomly determines the arrangement of the symbols in the slot game, scrolls the video reels in the scroll areas 211, 212, 213, 214, and 215 and stops the reels in order at different timings. When the symbols displayed in the scroll areas 211, 212, and 213 with at least one reel which stops first satisfy the predetermined condition, the information processor 1 sets the effect display frame 22 on the scroll area 215, hides the rotating video reel behind the effect display frame 22, and displays the indication effect 221 corresponding to a predetermined game result in the effect display frame 22. After the execution of the indication effect, the information processor 1 displays the video reel of the effect display frame 22 again to display the symbol rearrangement in that video reel.

Because the last rotating video reel is temporarily hidden and the indication effect 221 is displayed, it is suggested for the player that the displayed effect is an effect related to a game result which is determined by the last rotating video reel.

(Mechanical Structure)

As described above, the information processor 1 includes a display 2 provided on the front surface of a housing 11 and a touch panel 5 provided throughout the display 2. While the information processor 1 is a smartphone in the present embodiment, the information processor 1 may be a mobile device or a desktop device. Examples of the mobile information processor 1 include mobile information devices such as a portable computer, a laptop computer, a tablet PC, a handheld PC, and a PDA (Personal Data Assistant).

The display 2 is configured to be able to display images. The display method of the display 2 is, for example, liquid crystal, organic electroluminescence, CRT (Cathode Ray Tube), or plasma. The touch panel 5 makes it possible to detect the coordinates of a part touched by a user's finger or the like. The touch panel 5 adopts an already known technology such as electromagnetic induction and electrostatic capacity. The information processor 1 determines an object on the screen touched by the user, or the state of the touching such as swipe and the like based on coordinates detected by the touch panel 5. The information processor 1 then makes a response according to the determination result. Hereinafter, determination of an object which is the target of input from the user by the information processor 1 may be referred to as user's selection of or touch input to an object.

The touch panel 5 may not be provided throughout the display 2. For example, the touch panel 5 may be provided on the back side of the housing 11, which is opposite to the display 2. Alternatively, the touch panel 5 may be provided at part of the display 2.

Further, in the present embodiment, the touch panel 5 operates as an input device, and accepts a swipe input, a touch input, and the like; however, the present embodiment is not limited to this. For example, a microphone or a camera may be adopted as an input device, and may receive the user's voice or gesture as an instruction input.

(Electrical Structure)

Figure 2:
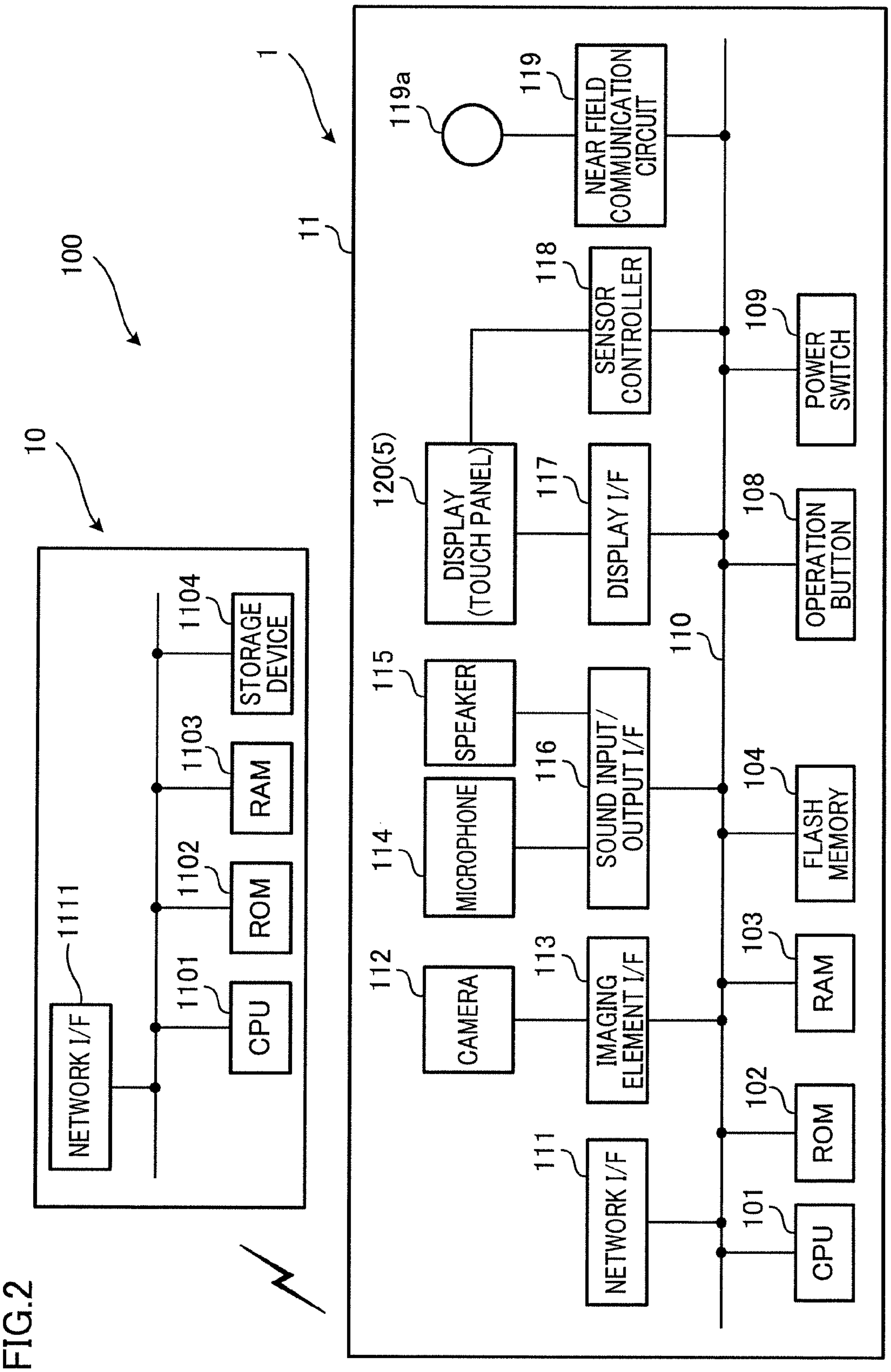
FIG. 2 is a block diagram of the electrical configuration of the information processor.

As shown in FIG. 2, the information processor 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119*a* of the near field communication circuit 119.

Further, the server 10 is a so-called computer including a CPU 1101, a ROM 1102, a RAM 1103, a storage device 1104 such as a hard disk drive and the like, and a network I/F 1111.

The CPU (Central Processing Unit) 101 functions as a main structure of the controller in the information processor 1, and controls the entire operation of the information processor 1. The CPU 1101 functions as a main structure of the controller in the server 10, and controls the entire operation of the server 10. The CPUs 101 and 1101 therefore function as controllers which control the entire operation of the game system 100. The ROM (Read Only Memory) 102 stores programs used for driving the CPU 101, such as an IPL (Initial Program Loader).

The RAM (Random Access Memory) 103 and the RAM 1103 are used as a work area of the CPU 101 and the CPU 1101. The operation button 108 is used for, for example, initial setting of the information processor 1. The power switch 109 is used for turning on/off the power source of the information processor 1.

The flash memory 104 as a memory is a non-transitory computer readable medium which stores the game program, a program for communication, and plural sets of data such as image data and sound data. The storage device 1104 is a non-transitory computer readable medium which functions as a database, and stores game data of each of the information processors 1. In response to a request from the game program in the information processor 1, the server 10 returns as needed a response referring to the database in the storage device 1104.

For example, the flash memory 104 stores various programs including a game program executed by the CPU 101 as a controller and various data used in the various programs. To put it differently, the game program stored causes the information processor 1 having the CPU 101 and the flash memory 104 to execute processes of programs. For example, when the information processor 1 is equivalent to the game system 100, the flash memory 104 (storage device 1104) stores various programs including a game program executed by the CPU 101 (CPU 1101) as a controller and various data used in the various programs. To put it differently, the game program stored causes the information processor 1 (game system 100) having the CPU 101 (CPU 1101) and the flash memory 104 (storage device 1104) to execute processes of programs. As such, the processes and operations of the information processor 1 can be interpreted as those of a program or a game control method.

The data and program in the flash memory 104 and the storage device 1104 may be stored in advance at the stage of factory shipment, or may be downloaded from an unillustrated server or the like via communication means and stored. The communication means may be an interactive communication passage such as the Internet and a cable TV, or may be one-way broadcasting. Alternatively, the data and program stored in the memory flash memory 104 and the storage device 1104 may be stored in a recording medium such as a floppy disk, a CD-ROM, a DVD-ROM, an MO (optical magnetic disc), and a flash memory, and may be read from the recording medium and installed in the memory according to need.

The network I/F (Interface) 111 and the network I/F 1111 are each an interface for data communications using a communication network such as the internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

(Slot Game: Definitions)

The slot game is playable by a user as a game element of the installed application software. The slot game is a game in which symbols are varied and then stopped in the symbol display area 21 (rearrangement) and a gaming value is awarded based on a combination of symbols displayed in the symbol display area 21. A state in which symbols are displayed after being varied and stopped in the symbol display area is termed "rearrangement". In the slot game, a bonus game advantageous for the player as compared to the normal game may be executed when the normal game is executed and a predetermined condition is satisfied in the normal game.

A gaming value is used as a substitute for credits in the game, and is used for betting as a condition to execute the slot game. That is, a user plays the slot game (unit game) once by betting a gaming value, and may acquire a gaming value as a result of the slot game.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

(Slot Game: Functional Blocks)

Figure 3:
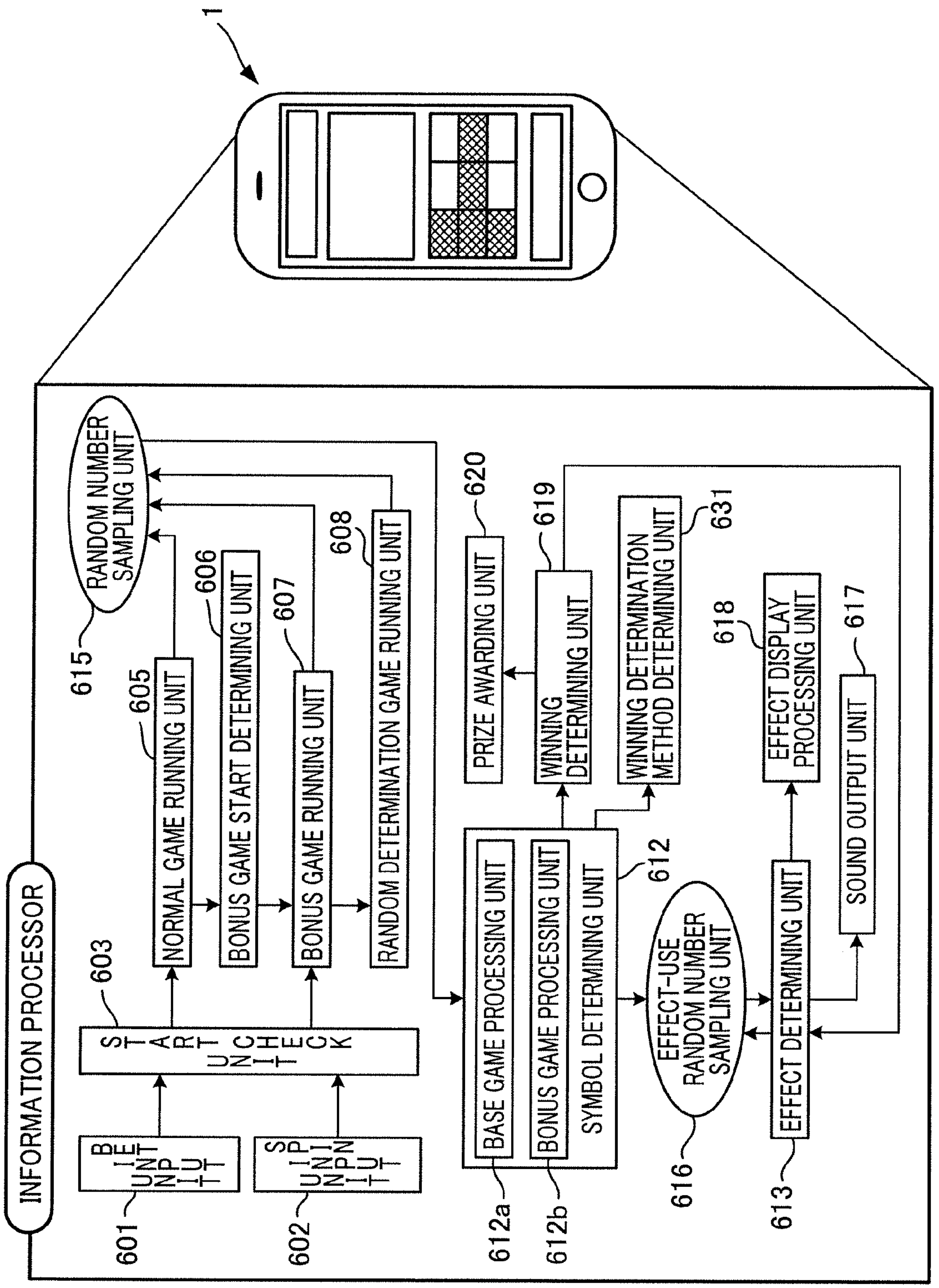
FIG. 3 is a functional block diagram of the information processor.

As shown in FIG. 3, the terminal device 1 which is a gaming machine running the slot game has the following functions. To be more specific, the terminal device 1 includes a BET input unit 601 and a spin input unit 602. The BET input unit 601 and the spin input unit 602 are kinds of input devices. The BET input unit 601 has a function of receiving a bet in response to a user operation. The spin input unit 602 has a function of receiving a user operation, i.e., an instruction to start a game.

The information processor 1 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processing unit 618, a winning determining unit 619, a prize awarding unit 620, and a winning determination method determining unit 631.

The normal game running unit 605 has a function of running a normal game which is a base game, on condition that the BET input unit 601 is operated. The bonus game start determining unit 606 determines whether to run a bonus game, based on a combination of rearranged symbols resulted from the normal game. In other words, the bonus game start determining unit 606 has functions of: determining that the player is entitled to a bonus game when a bonus trigger condition is established; and activating the bonus game running unit 607 so as to run a bonus game from the subsequent unit game. The random determination game running unit 608 has a function of randomly determining prizes including the bonus game. As this function is executed after the execution by the bonus game running unit 607, the bonus game can be repeatedly run.

The symbol determining unit 612 includes a base game processing unit 612*a* and a bonus game processing unit 612*b*. The symbol determining unit 612 including these processing units 612*a* and 612*b* has functions of: determining symbols to be rearranged based on a random number given from the random number sampling unit 615; rearranging the determined symbols in the game area 291 of the display 2; outputting rearrangement information of the symbols to the winning determining unit 619; and outputting an effect instruction signal to the effect-use random number sampling unit 616, based on the combination of the rearranged symbols.

The effect-use random number sampling unit 616 has functions of: when receiving the effect instruction signal from the symbol determining unit 612, extracting an effect-use random number; and outputting the effect-use random number to the effect determining unit 613. The effect content determining unit 613 has functions of: determining an effect content by using the effect-use random number; outputting image information on the determined effect content to the effect display processing unit 618; and outputting audio and illumination information of the determined effect content to the sound output unit 617.

The winning determining unit 619 has functions of: determining whether a winning is achieved based on a combination of symbols when rearrangement information of the symbols is given; calculating an amount of payout based on a winning combination formed when it is determined that a winning has been achieved; and outputting, to the prize awarding unit 620, a payout signal which is based on the payout amount. The prize awarding unit 620 has a function of paying out a gaming value to the user.

When, for example, the information processor 1 executes the indication effect based on the ratio of a payout amount to a bet amount, the winning determining unit 619 may have a function of outputting the payout amount to the effect content determining unit 619. The effect content determining unit 619 may have a function of requesting the effect-use random number sampling unit 616 to send a random number for determining the indication effect, when the ratio of the payout amount to the bet amount meets the condition of executing the indication effect. The effect content determining unit 619 may have a function of determining the indication effect based on the random number.

Though not shown, the outputted contents by each of the above processing units is suitably transmitted to the server 10 connected via a communication line.

While processes and actions are described in the present embodiment with the assumption that the information processor 1 which is a smartphone has the functions above, the functions may be distributed to the components of the game system 100. For example, random determination of a result of the slot game may be performed by the server 10.

(Slot Game: Game Contents)

As the slot game, the information processor 1 has two game modes, namely a normal game mode and a bonus game mode. The normal game mode is a game state during the normal game, whereas the bonus game mode is equivalent to a game state in the free game. The information processor 1 shifts to the bonus game mode when the unit game is run in the normal game mode and a bonus trigger condition is satisfied in the normal game mode. The trigger of the bonus game is, for example, a condition in which three or more bonus symbols appear (are rearranged). The trigger of the bonus game may be another condition.

(Slot Game: Game Contents: Normal Game Mode)

The normal game mode is specifically described. In the game area displayed on the display 2 (see FIG. 1), symbols for the slot game are rearrangeable on the video reels with 3 rows and 5 columns. In a betting process, a bet amount is selected by the user. The bet amount is, for example, selected from numbers such as 1, 2, 3, 5, and 10 by operating the bet button, or an input of a desirable number may be enabled. The resource generated by accumulating parts of bet amounts is termed jackpot.

Thereafter, in the game area, as the symbols are rearranged by varying (scroll-moving) and stopping (scroll-stop) the video reels, whether winning is achieved is determined. Then win determination is performed based on the state of the rearranged symbols. For example, a bonus game trigger is established when three or more bonus symbols are rearranged in the game area.

(Slot Game: Game Contents: Normal Game Mode: High-Probability Game and Low-Probability Game) The slot game which is run in the normal game mode is one of two types of games, namely a high-probability game and a low-probability game. Although not illustrated, the information processor 1 uses different symbol arrays between the high-probability game and the low-probability game. In a high-probability-game video reel used in the high-probability game, the number of long symbols on the symbol array is larger than the number of long symbols on a low-probability-game video reel used in the low-probability game, in order to arrange the trigger of the bonus game to be easily established.

Each time the low-probability game is run in the normal game mode, the information processor 1 performs random determination for the shift to the high-probability game. When a win is achieved in the random determination, the information processor 1 changes the slot game executed in the normal game mode to the high-probability game. When the execution of the free game is finished in the bonus game mode, the information processor 1 sets the slot game in the subsequent normal game mode to be the high-probability game. In any case, the number of times of execution of the high-probability game is randomly determined. When the high-probability game is executed the determined number of times, the slot game thereafter is the low-probability game.

(Slot Game: Game Contents: Bonus Game Mode)

The normal game mode shifts to the bonus game mode when the trigger condition of the bonus game is established, and a free game process is executed, to begin with.

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed. This win determination may be identical with the win determination in the normal game. For example, when three or more bonus symbols appear in the game area again, a retrigger condition of the bonus game (free game) is established, and the number of times of execution of the free game is increased.

Thereafter, whether the free game ends is determined. If the remaining number of times of execution of the free game is not zero, the free game is run for the remaining number of times.

(Indication Effect in Effect Display Frame)

The following will describe an example of the indication effect performed in the effect display frame 22 on the display 2.

Figure 4:
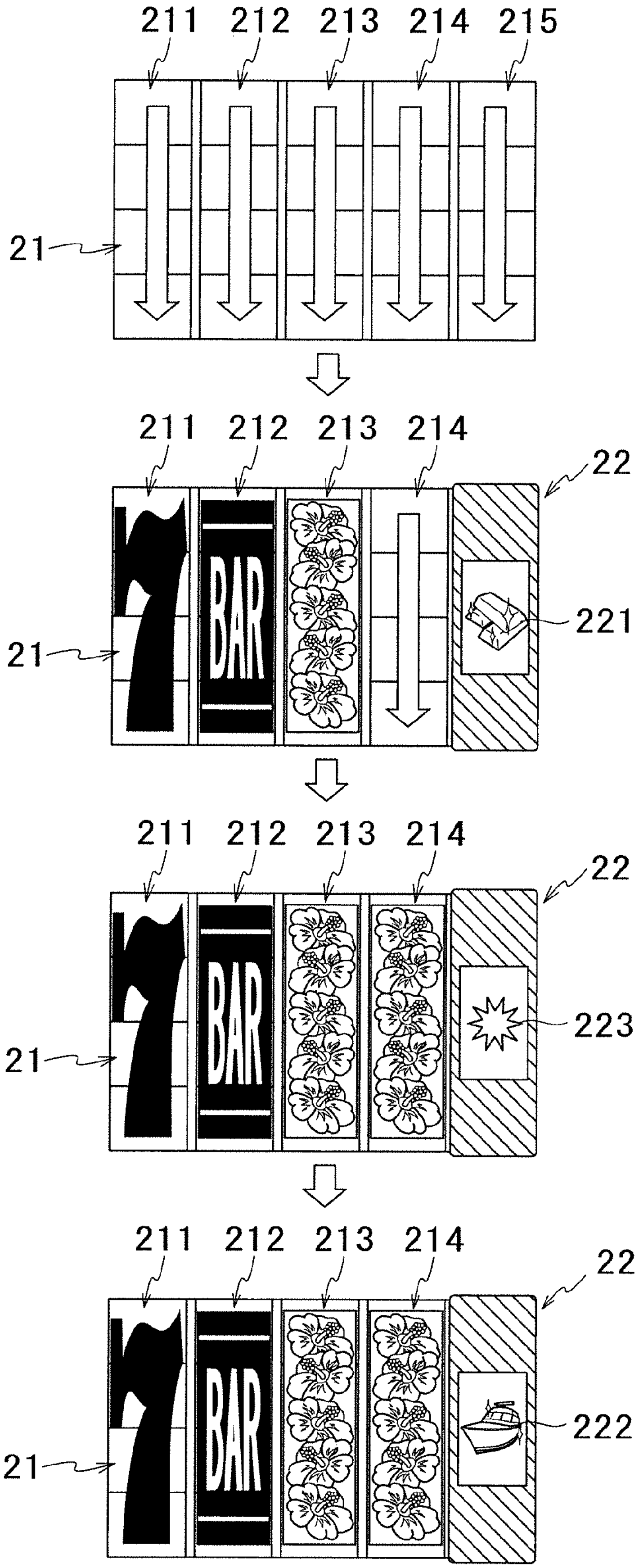
FIG. 4 shows an example of an indication effect in an effect display frame.

As shown in FIG. 4, when the slot game starts, the scroll of the video reels starts in the scroll areas 211, 212, 213, 214, and 215 in the symbol display area 21 of the display 2. For convenience, in the drawings, the cells of the scroll areas 211, 212, 213, 214, and 215 may be depicted as frames.

To begin with, the scroll of the video reel in the scroll area 211 stops. Then the video reels of the scroll area 212, the scroll area 213, the scroll area 214, and the scroll area 215 stop in order at different timings.

As shown in FIG. 4, in the present embodiment, when the scroll of the video reels in the scroll area 211, the scroll area 212, and the scroll area 213 stops, the effect display frame 22 is displayed on the scroll area 215 and the indication effect 221 is displayed. The timing to display the effect display frame 22 is not particularly limited as long as the timing is before the stop of the scroll of the video reel in the scroll area 215. For example, the effect display frame 22 and the indication effect 221 may be displayed while all video reels are rotating.

In the present embodiment, as the indication effect 221, images indicating "Gold Nugget", "Wad of Bills", "Clock", "Car and Jewel", and "All Together" are displayed. "All Together" is an image in which plural images displayed in the indication effect 221 and the advanced indication effect 222 are displayed.

As shown in FIG. 4, the scroll of the video reel in the scroll area 214 stops, and the indication effect 221 disappears and an advanced image 223 is displayed in the effect display frame 22. Thereafter, in the effect display frame 22, the advanced image 223 disappears and the advanced indication effect 222 is displayed. In the present embodiment, as the advanced indication effect 222, images indicating "Ship", "Car", and "Jewel" are displayed.

Figure 5:
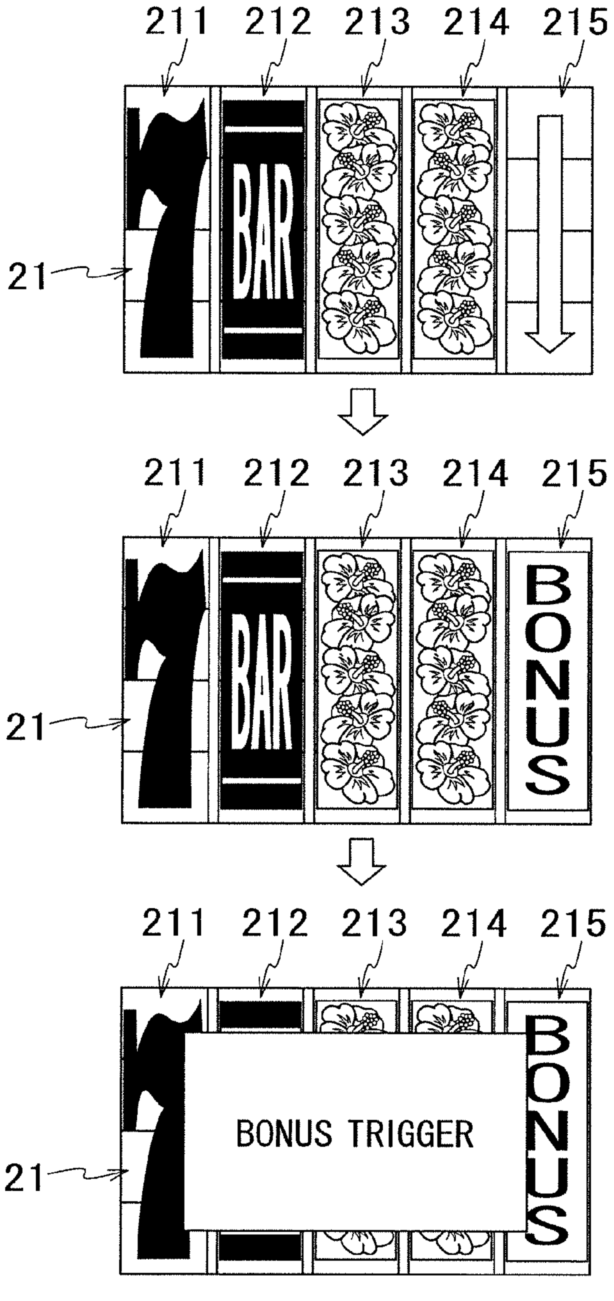
FIG. 5 shows an example of an indication effect in the effect display frame.

Thereafter, as shown in FIG. 5, the effect display frame 22 disappears and the scroll area 215 is displayed again. In other words, the scroll of the video reel in the scroll area 215 is displayed again. Then the scroll of the video reel in the scroll area 215 stops and the symbols are rearranged in the scroll areas 221 to 215.

FIG. 5 shows a state in which long symbols stop in all scroll areas 221 to 215 and the bonus game is triggered.

(Re-Trigger Roulette Effect in Effect Display Frame)

In the bonus game, when the symbol arrangement triggers the bonus game as shown in FIG. 5, re-trigger is established. When the re-trigger is established, the effect display frame 22 is displayed on the scroll area 215 of the symbol display area 21, and a re-trigger roulette effect of adding the number of times of execution of the free game in the bonus game is executed in the effect display frame 22.

Figure 6:
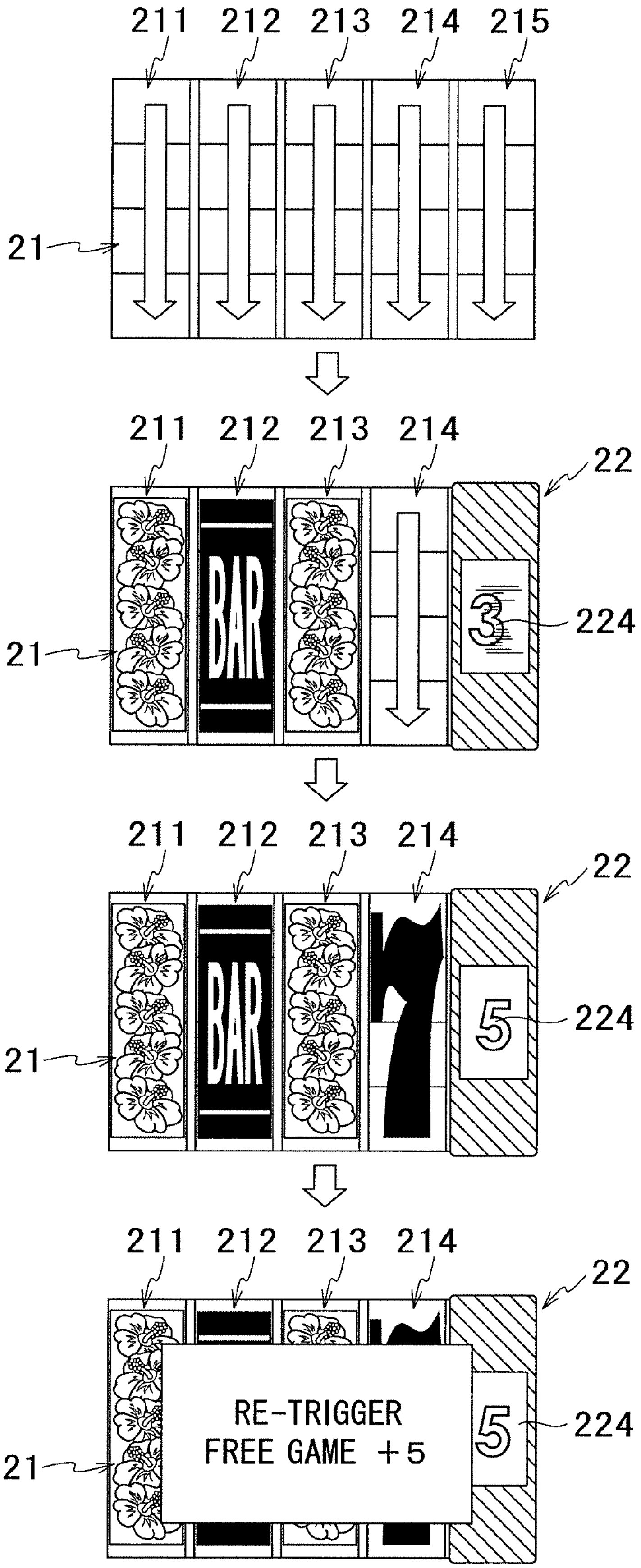
FIG. 6 shows an example of a re-trigger roulette effect in the effect display frame.

As shown in FIG. 6, when the slot game starts, the scroll of the video reels starts in the scroll areas 211, 212, 213, 214, and 215. When the scroll of the video reels stops in the scroll area 211, the scroll area 212, and the scroll area 213, the effect display frame 22 is displayed on the scroll area 215 and a re-trigger roulette effect 224 is displayed.

As shown in FIG. 6, the re-trigger roulette effect 224 is an effect in which an image showing numbers scrolls and then one number is stop-displayed in the effect display frame 22. The number of times of execution of the free game, which corresponds to the stop-displayed number, is added. The re-trigger roulette effect 224 is used as the indication effect, too. When "0" is displayed in the re-trigger roulette effect 224, the added number of times of execution of the free game is "0" (lose).

(Data Table)

The following describes a data table stored in the information processor 1.

(Data Table: Indication Effect Tables)

The flash memory 104 of the information processor 1 stores a low-probability indication effect table (see FIG. 7), a high-probability indication effect table (see FIG. 8), and a common indication effect table (see FIG. 9).

The low-probability indication effect table is used in random determination for the indication effect when the slot game is the low-probability game. The high-probability indication effect table is used in random determination for the indication effect when the slot game is the high-probability game. The common indication effect table is used in random determination for the indication effect no matter whether the slot game is the high-probability game or the low-probability game.

As shown in FIG. 7 to FIG. 9, each of these indication effect tables includes a game result column, an indication effect column, an advanced indication effect column, and a probability column. The high-probability indication effect table (see FIG. 8) additionally includes a game mode column.

The game result column stores game results of the slot game. When a game result of the executed slot game corresponds to one of the game results stored in the game result column of one of the indication effect tables, the information processor 1 performs random determination for selecting one of the indication effects associated with the game result.

The indication effect column and the advanced indication effect column store indication effects and advanced indication effects associated with game results, respectively. There are plural indication effects associated with the same game result and there are plural advanced indication effects associated with the same game result. One of them is randomly selected in accordance with a game result.

The probability column stores a random determination probability of selection of an associated indication effect or advanced indication effect. The random determination probability is a random determination probability in each game result. For example, according to the common indication effect table (see FIG. 9), indication effects and advanced indication effects corresponding to "Payout Rate Is 100 or Higher" are "All Together", "Wad of Bills->Ship", "Gold Nugget->Ship", and "Car and Jewel". The probability of selection of each of these effects is 25%. In other words, the table shows that, in the case of "Payout Rate Is 100 or Higher", each of these four indication effects and advanced indication effects is randomly selected with the probability of 25%.

In the low-probability indication effect table (see FIG. 7), indication effects corresponding to "Payout Rate Is 5 or Lower" are "Gold Nugget (Short)" and "Clock (Short)", and the probability of selection of each of these effects is 5%. This indicates that, in the low-probability slot game, the probability of execution of the indication effect in the case of "Payout Rate Is 5 or Lower" is 10% in total. This indicates that, in the low-probability slot game, the probability of non-execution of the indication effect in the case of "Payout Rate Is 5 or Lower" is 90%. The "Gold Nugget (Short)" is an effect which displays the same image as the "Gold Nugget" but is shorter in time than the "Gold Nugget".

In the high-probability indication effect table (see FIG. 8), the random determination probability of "Gold Nugget->Ship" when the bonus will be won is 55%, whereas the random determination probability of "Gold Nugget->Ship" when the bonus will not be won is 30%. As such, when the indication effect "Gold Nugget->Ship" is displayed, the probability of winning the bonus is high. Therefore the indication effect "Gold Nugget->Ship" is relatively highly reliable regarding the wining of the bonus. Meanwhile, the random determination probability of "Gold Nugget->Car" when the will be won is 25%, whereas the random determination probability of "Gold Nugget->Car" when the bonus will not be won is 70%. As such, when the indication effect "Gold Nugget->Car" is displayed, the probability of not winning the bonus is high.

To put it differently, the probability of winning the bonus is higher when the indication effect is "Gold Nugget->Ship" than when the indication effect is "Gold Nugget->Car", and hence the reliability of the former effect is higher than that of the latter effect, regarding the winning of the bonus. As such, indication effects with different reliabilities are stored, and one of the indication effects is randomly selected so that the probability of achieving a predetermined game result after the indication effect is high when the reliability of the selected indication effect is high. This allows the player to predict the game result during the reel rotation, and therefore improves the entertainment characteristics.

Furthermore, for example, by using an indication effect which is displayed only in the high-probability game such as "Wad of Bills" which is an indication effect in the high-probability game, it is possible to allow the player to recognize that the slot game is a high-probability game.

(Data Table: Additional Free Game Number Random Determination Table)

The flash memory 104 of the information processor 1 stores an additional free game number random determination table (see FIG. 10).

As shown in FIG. 10, the low-probability indication effect table includes an additional game count column and a probability column. The additional game count column stores options (1 to 5) of the number of times of execution of the free game to be added when the re-trigger is established in the bonus game. An effect with which the number of times of execution of the free game is 0 is an indication effect which can be executed only when no re-trigger is established in the bonus game. The probability column stores random determination probabilities associated with the respective options of the number of times of execution of the free game.

(Operations)

The following will describe a game program executed by the CPU 101 of the information processor 1.

(Operation: Slot Game Process)

The following describes a game program in a slot game process executed by the CPU 101 of the information processor 1.

Figure 11:
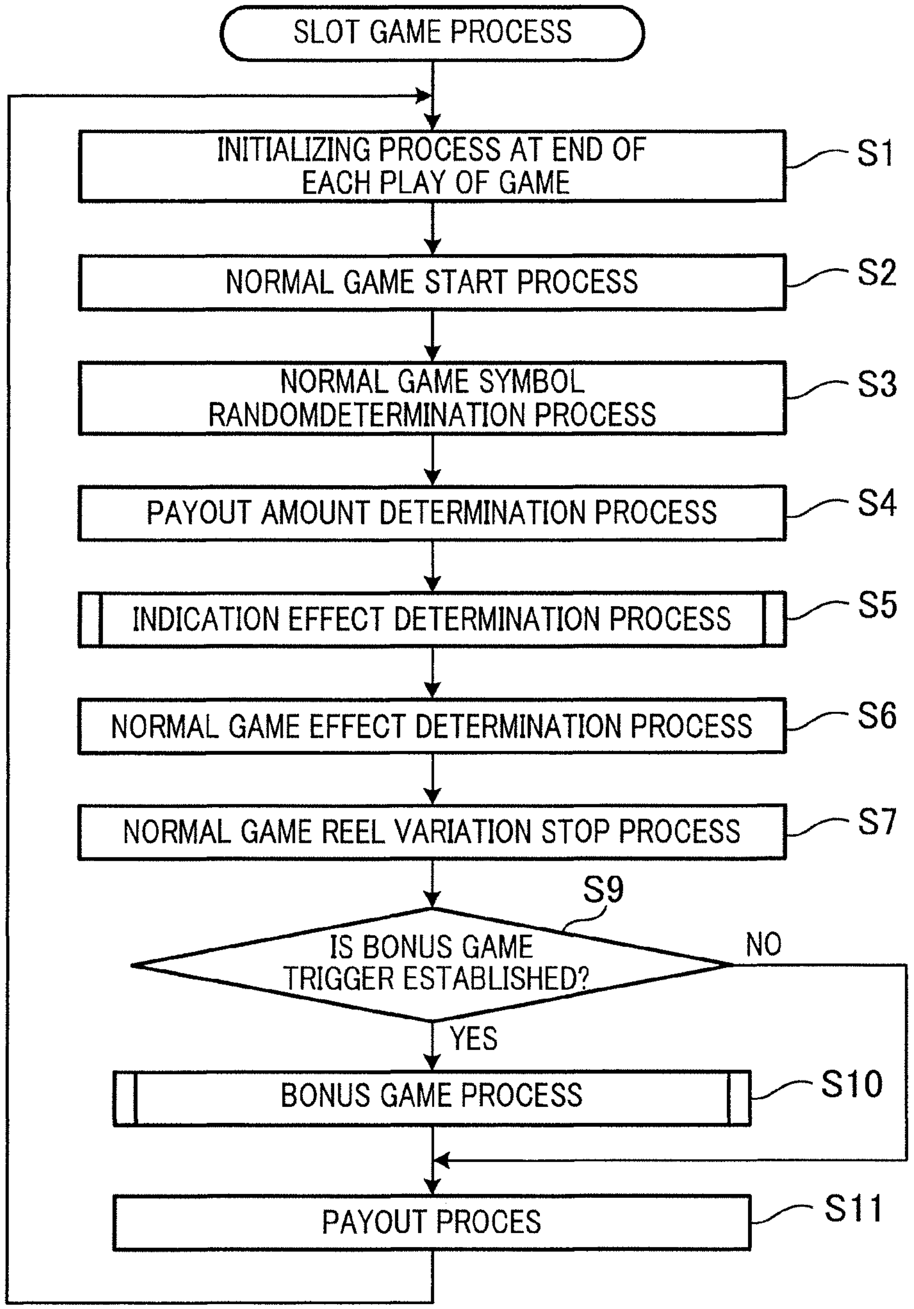
FIG. 11 is a flowchart of a slot game process.

As shown in FIG. 11, the CPU 101 executes an initializing process at the end of each play of the game (S1). For example, the CPU 101 clears data in a working area of the RAM 103, which becomes unnecessary at the end of each play of game, e.g., the bet amount and symbols selected by random determination. The CPU 101 then executes a normal game start process (S2). In the normal game start process, the CPU 101 checks a bet amount input through the touch panel 5, for example. The CPU 101 then executes a normal game symbol random determination process (S3). In this process, the CPU 101 randomly selects and determines symbols 500 to be stopped based on a random number, with reference to a symbol array table (see FIG. 5) for the first video reel.

Subsequently, the CPU 101 executes a payout amount determination process (S4). To be more specific, the CPU 101 determines whether a winning combination is established on a selected payline and a win is achieved, and determines a payout amount for each of all wins regarding the payline, when a win is achieved. The CPU 101 further determines whether the bonus game is triggered. The CPU 101 then executes the indication effect determination process (S5). This indication effect determination process will be described later.

Subsequently, the CPU 101 executes a normal game effect determination process (S6). The CPU 101 then executes a normal game reel variation stop process (S7). In this process, based on the indication effect determined in the step S5 and the effect determined in the step S6, the CPU 101 performs control such as displaying the effect on the display 2 and outputting sound from the speaker 115.

Subsequently, based on the result of the step S4, the CPU 101 determines whether the bonus game trigger is established (S9). When the bonus game trigger is established (YES in S9), the CPU 101 executes a bonus game process (S10).

Meanwhile, when the bonus game trigger is not established (NO in S9) or after the bonus game process in the step S10, the CPU 101 executes a payout process (S11). To be more specific, the CPU 101 adds a value stored in the payout amount storage area to a value stored in a credit amount storage area (credit counter) provided in the RAM 103. Then the CPU 101 executes the steps again from S1.

(Bonus Game Process)

Figure 12:
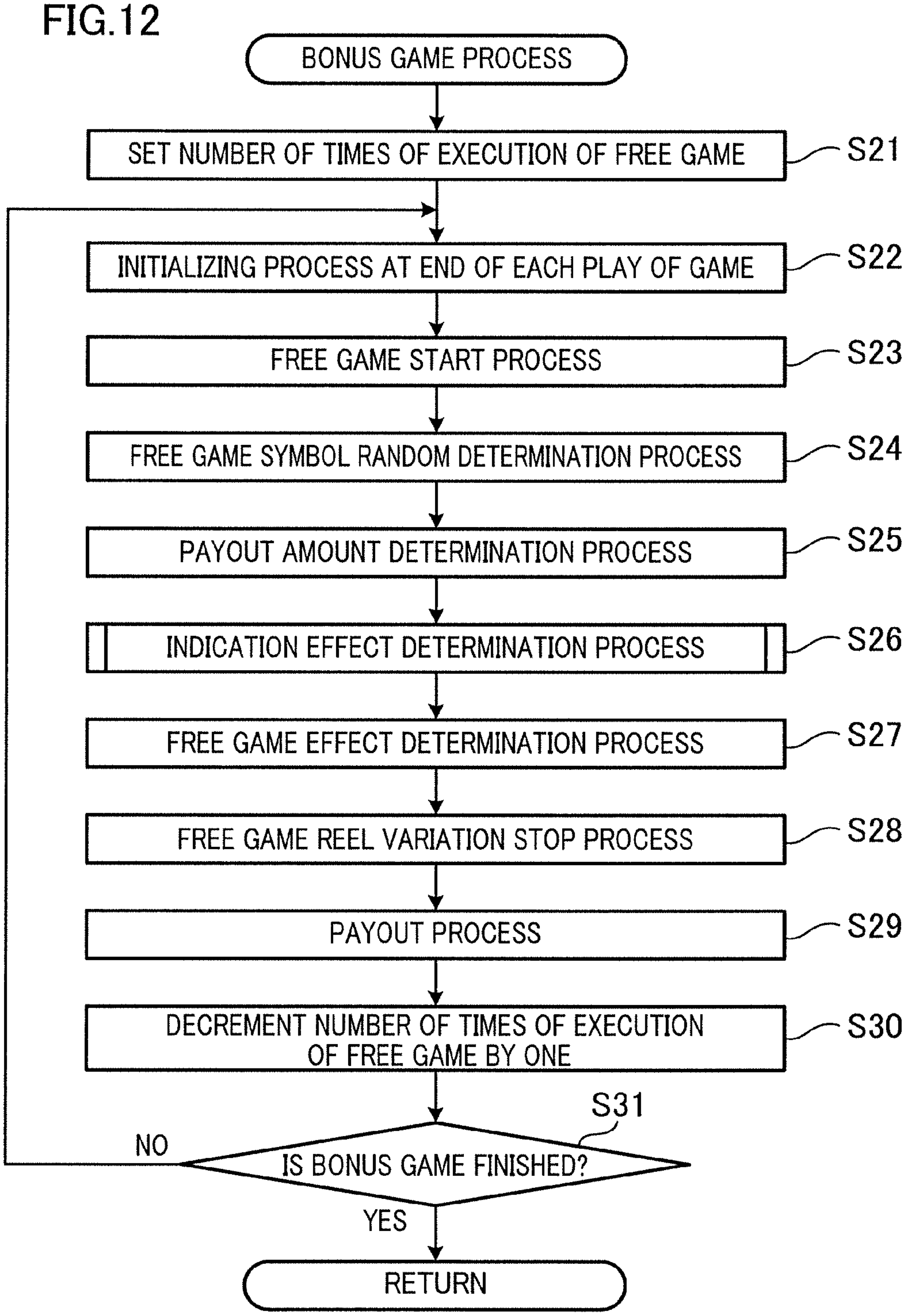
FIG. 12 is a flowchart of a bonus game process.

With reference to FIG. 12, the following describes the game program in relation to the bonus game process which is a sub routine of the slot game process executed by the CPU 101 of the information processor 1.

To begin with, the CPU 101 sets the number of times of execution of the free game (S21). For example, the CPU 101 sets the number of times of execution of the free game at 5. Thereafter, the CPU 101 executes an initializing process at the end of each play of the game (S22). For example, the CPU 101 clears data in a working area of the RAM 103, which becomes unnecessary at the end of each play of game, e.g., symbols selected by random determination. It is noted that the bet amount in the bonus game is identical with the bet amount in the normal game immediately before the shift to the bonus game.

Thereafter, in the same manner as in the normal game, the CPU 101 executes a free game start process (S23), a free game symbol random determination process (S24), a payout amount determination process (S25), an indication effect determination process (S25), a free game effect determination process (S27), a free game reel variation stop process (S28), and a payout process (S29).

In the free game, a symbol random determination table for the free game, which is different from the symbol array table for the first video reel and the symbol array table for the second video reel used in the normal game, may be used. The symbol random determination table for the free game is preferably more advantageous than the tables used in the normal game. For example, in the symbol array table for the first video reel in the free game, the percentage of symbols related to a winning combination with a large payout amount is high (or the probabilities of stop of such symbols are high), the number of wild symbols is large (or the probabilities of stop of such symbols are high), or the number of bonus symbols is large (or the probabilities of stop of such symbols are high). In the symbol column table for the second video reel in the free game, for example, the number of special symbols 510 is large (or the probabilities of stop of such symbols are high) as compared to the video reel in the normal game.

Subsequently, the CPU 101 decrements the current number of times of execution of the free game by one (S29). Then the CPU 101 determines whether the bonus game has been finished (S30). When the number of times of execution of the free game is not 0 (NO in S30), the CPU 101 determines that the bonus game has not been finished, and executes the free game again from the step S22. Meanwhile, when the number of times of execution of the free game is 0 (YES in S30), the CPU 101 determines that the bonus game has been finished, and ends the sub routine and returns to the slot game process.

Although not illustrated, when the payout amount is determined in each of the slot game process and the bonus game process, the CPU 101 executes a process of sending the payout amount to the server 10 as an acquired amount.

(Indication Effect Determination Process)

Figure 13:
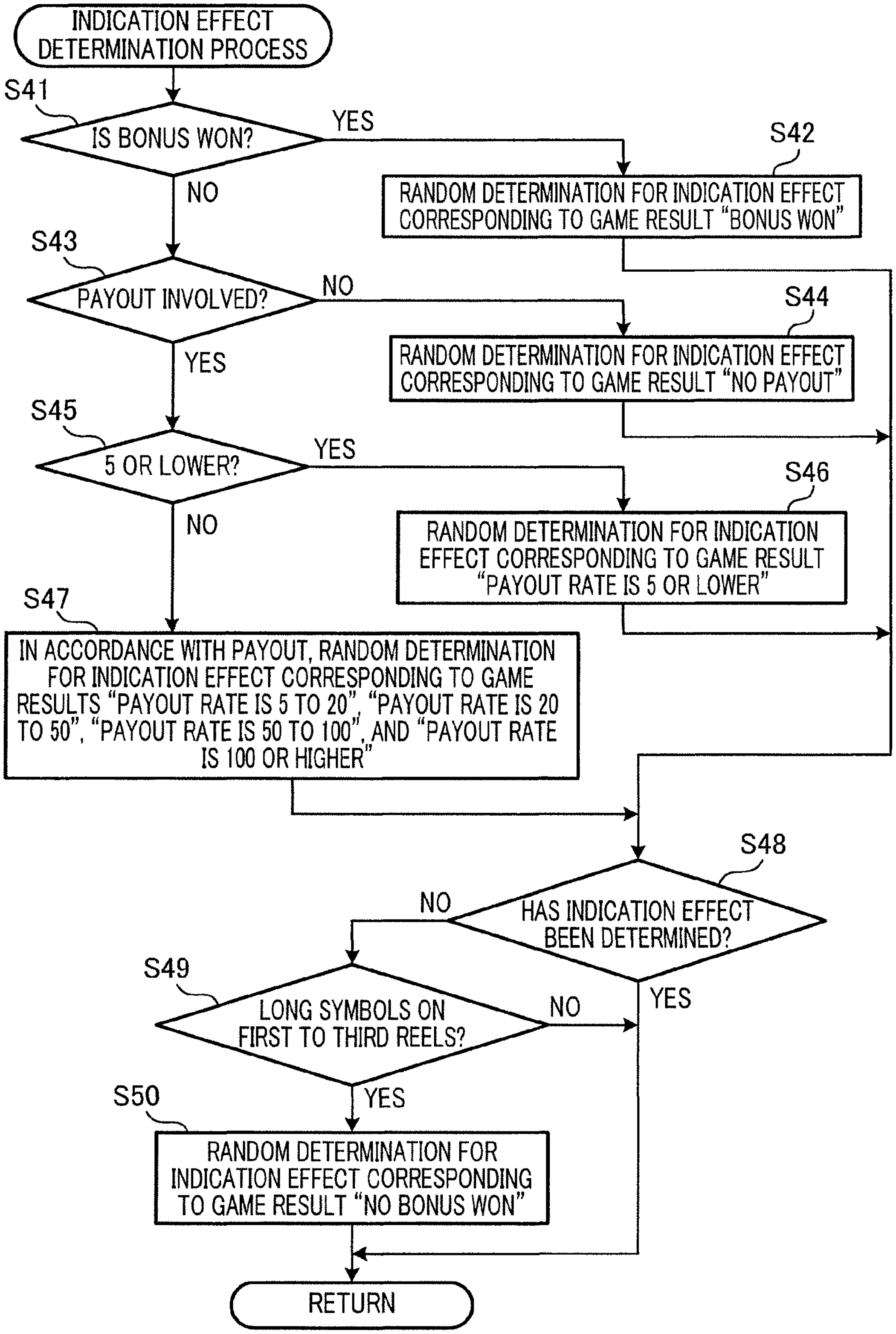
FIG. 13 is a flowchart of an indication effect determination process.

With reference to FIG. 13, the following describes a game program in relation to the indication effect determination process which is a sub routine of the slot game process and the bonus game process executed by the CPU 101 of the information processor 1.

To begin with, the CPU 101 determines whether a game result is winning of the bonus game (S41). When the bonus game is won (YES in S41), the CPU 101 executes random determination for the indication effect corresponding to the game result “Bonus Won” either with reference to the low-probability indication effect table (see FIG. 7) when the slot game is the low-probability game or the high-probability indication effect table (see FIG. 8) when the slot game is the high-probability game (S42).

Meanwhile, when the bonus game is not won (NO in S41), the CPU 101 determines whether the game result involves a payout (S43). When no payout is involved (NO in S43), the CPU 101 executes random determination for the indication effect corresponding to the game result “No Payout” either with reference to the low-probability indication effect table (see FIG. 7) when the slot game is the low-probability game or the high-probability indication effect table (see FIG. 8) when the slot game is the high-probability game (S44).

Meanwhile, when a payout is involved (YES in S43), the CPU 101 determines whether the payout rate of the game result is 5 or lower (S45). When the payout rate is 5 or lower (YES in S45), the CPU 101 executes random determination for the indication effect corresponding to the game result “Payout Rate Is 5 or Lower” either with reference to the low-probability indication effect table (see FIG. 7) when the slot game is the low-probability game or the high-probability indication effect table (see FIG. 8) when the slot game is the high-probability game (S46).

Meanwhile, when the payout rate of the game result is not 5 or lower (NO in S45), with reference to the common indication effect table (see FIG. 9), the CPU 101 executes random determination for the indication effect corresponding to the game result “Payout Rate is 5 to 20”, the game result “Payout Rate is 20 to 50”, the game result “Payout Rate is 50 to 100”, or the game result “Payout Rate is 100 or Higher”, in accordance with the payout (S47).

After the steps S42, S44, S46, and S47, the CPU 101 determines whether the indication effect has been determined (S48). In other words, the CPU 101 determines whether the indication effect has been determined as a result of random determination for the indication effect in the steps S42, S44, S46, and S47 described above.

When the indication effect has not been determined (NO in S48), the CPU 101 determines whether the long symbols are rearranged on the first to third reels (S49). When the long symbols are rearranged on the first to third reels (YES in S49), the CPU 101 executes random determination for the indication effect in the game result “No Bonus Won” either with reference to the low-probability indication effect table (see FIG. 7) when the slot game is the low-probability game or the high-probability indication effect table (see FIG. 8) when the slot game is the high-probability game (S50). Then the CPU 101 terminates the routine.

When the indication effect has been determined in the step S48 (YES in S48) or the long symbols are not rearranged on the first to third reels (NO in S49), the CPU 101 terminates the routine.

Embodiments of the present invention thus described above solely serve as specific examples of the present invention, and are not to limit the scope of the present invention. The specific structures and the like are suitably modifiable. Further, the effects described in the embodiments of the present invention described in the above embodiment are no more than examples of preferable effects brought about by the present invention, and the effects of the present invention are not limited to those described hereinabove.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. An information processor comprising:

a display which is configured to display a play image in which reels each having a symbol array on which symbols are arranged scroll and then stop so that at least one of the symbols is rearranged on the symbol array in N display frames and a game result of a slot game is output in accordance with arrangement of the symbols in the display frames;

a storage unit configured to store a plurality of indication effects, each of which corresponds to a potential game result and the indication effects being different in reliability such that a probability of achieving the corresponding potential game result after execution of the indication effect is high when reliability of the indication effect is high and the probability of achieving the corresponding potential game result after execution of the indication effect is low when reliability of the selected indication effect is low; and a controller, the controller being programmed to execute the processes of:

internally and randomly determining the arrangement of the symbols in the slot game;

starting scroll of the reels in the respective display frames and then stopping the reels in order at different timings to yield the game result;

when a symbol displayed in the display frame of at least one of the reels which stops first satisfies a predetermined condition, setting the display frame of the reel which is rotating and stops last as an effect display frame;

randomly selecting an indication effect from among the indication effects corresponding to the game result;

hiding the rotating reel behind the effect display frame and displaying, in the effect display frame, the selected indication effect corresponding to the game result; and after execution of the selected indication effect, displaying the reel at the effect display frame again so as to display arrangement of at least one reel on that reel.

2. The information processor according to claim 1, wherein when a symbol displayed in the display frame of N−2 reel which stops first satisfies the predetermined condition, the controller sets the display frame of the reel which stops last as the effect display frame and displays the selected indication effect in the effect display frame.

3. The information processor according to claim 1, wherein the game result is a trigger of execution of a bonus game in which the slot game is playable plural times with an advantageous condition, and when the trigger of execution of the bonus game is again achieved in the slot game in the bonus game, the controller executes an effect of determining the number of times of execution of the slot game, which is to be added to the bonus game, in the effect display frame.

4. A non-transitory computer-readable recording medium storing a game program causing a computer including a display and a memory to execute the processes of:

displaying a play image in which reels each having a symbol array on which symbols are arranged scroll and then stop so that at least one of the symbols is rearranged on the symbol array in N display frames in the display and a game result of a slot game is output in accordance with arrangement of the symbols in the display frames;

storing in the memory a plurality of indication effects, each of which corresponds to a potential game result and the indication effects being different in reliability such that a probability of achieving the corresponding potential game result after execution of the indication effect is high when reliability of the indication effect is high and the probability of achieving the corresponding potential game result after execution of the indication effect is low when reliability of the selected indication effect is low;

internally and randomly determining the arrangement of the symbols in the slot game;

starting scroll of the reels in the respective display frames and then stopping the reels in order at different timings to yield the game result;

when a symbol displayed in the display frame of at least one of the reels which stops first satisfies a predetermined condition, setting the display frame of the reel which is rotating and stops last as an effect display frame;

randomly selecting an indication effect from among the indication effects corresponding to the game result;

hiding the rotating reel behind the effect display frame and displaying, in the effect display frame, the selected indication effect corresponding to the game result; and after execution of the selected indication effect, displaying the reel at the effect display frame again so as to display arrangement of at least one reel on that reel.

5. A game control method comprising the steps of:

displaying a play image in which reels each having a symbol array on which symbols are arranged scroll and then stop so that at least one of the symbols is rearranged on the symbol array in N display frames in a display and a game result of a slot game is output in accordance with arrangement of the symbols in the display frames;

storing in a storage unit a plurality of indication effects, each of which corresponds to a potential game result and the indication effects being different in reliability such that a probability of achieving the corresponding potential game result after execution of the indication effect is high when reliability of the indication effect is high and the probability of achieving the corresponding potential game result after execution of the indication effect is low when reliability of the selected indication effect is low;

internally and randomly determining the arrangement of the symbols in the slot game;

starting scroll of the reels in the respective display frames and stopping the reels in order at different timings to yield the game result;

when a symbol displayed in the display frame of at least one of the reels which stops first satisfies a predetermined condition, setting the display frame of the reel which is rotating and stops last as an effect display frame;

randomly selecting an indication effect from among the indication effects corresponding to the game result;

hiding the rotating reel behind the effect display frame and displaying, in the effect display frame, the selected indication effect corresponding to the game result; and after execution of the selected indication effect, displaying the reel at the effect display frame again so as to display arrangement of at least one reel on that reel.

* * * * *